United States Patent [19]

Henze et al.

[11] 3,961,438

[45] June 8, 1976

[54] TROLLING APPARATUS

[75] Inventors: Walter J. Henze; San Thein, both of Philadelphia, Pa.

[73] Assignee: Penn Fishing Tackle Mfg. Co., Philadelphia, Pa.

[22] Filed: Mar. 10, 1975

[21] Appl. No.: 556,552

[52] U.S. Cl. .............................. 43/27.4; 43/43.12; 242/106
[51] Int. Cl.² ........................................ A01K 97/00
[58] Field of Search .................... 43/27.4, 4, 43.12; 242/106

[56] References Cited
UNITED STATES PATENTS

| | | |
|---|---|---|
| 2,587,308 | 2/1952 | Gilette ............................ 242/106 X |
| 2,888,770 | 6/1959 | Patrick ............................ 43/4 |
| 3,614,016 | 10/1971 | Rieth ............................ 43/27.4 X |
| 3,719,331 | 3/1973 | Harsch ............................ 43/43.12 X |
| 3,814,345 | 6/1974 | Kropelnicki ............................ 242/106 |
| 3,835,571 | 9/1974 | Berry ............................ 43/43.12 X |
| 3,844,058 | 10/1974 | King ............................ 43/27.4 |

Primary Examiner—Louis G. Mancene
Assistant Examiner—Daniel J. Leach
Attorney, Agent, or Firm—Zachary T. Wobensmith, 2nd; Zachary T. Wobensmith, III

[57] ABSTRACT

A large diameter reel for a trolling line is rotatably mounted on a base with a variable drag assembly in contact therewith and with a handle rotatable in one direction for reel rotation for winding.

Rotation of the reel for unwinding and winding of line with respect to the reel can be controlled by control of the drag with release for unwinding and tightening for winding so that winding of the line can be effected by rotating the handle. A shield is provided for heat dissipation from the drag.

A counter is provided driven through a gear train from the reel which measures the line payout and which can be reset to zero at any time.

The line from the reel passes over a wheel and bracket mounted on a boom which extends outwardly from the base, the bracket carries a bushing which can engage a stop piece on the line. The boom and bracket can both swivel in response to change of direction of the line. The bracket engages stops on the boom to limit its travel about the boom and prevent line tangling.

The base may be detachably secured to a mounting bracket which is fastened to the deck or transom of the boat.

10 Claims, 9 Drawing Figures

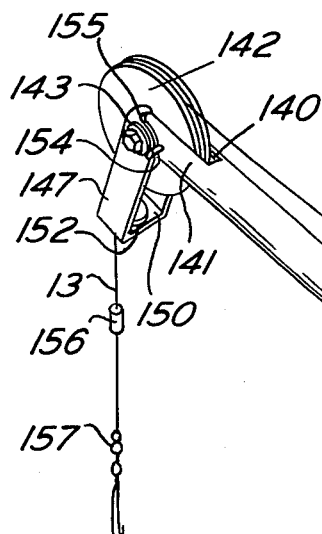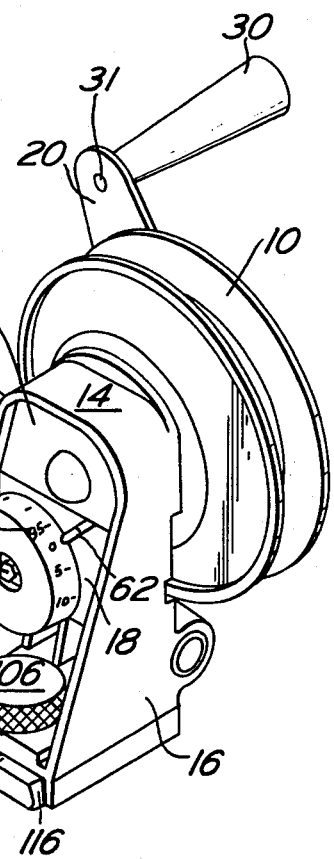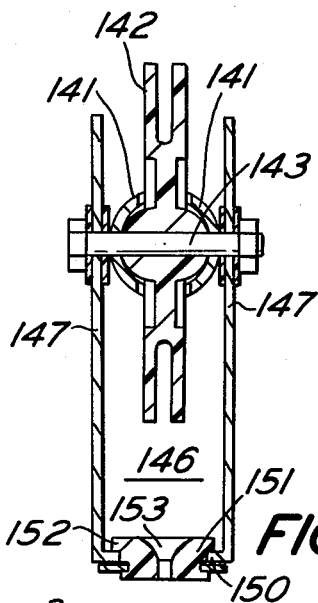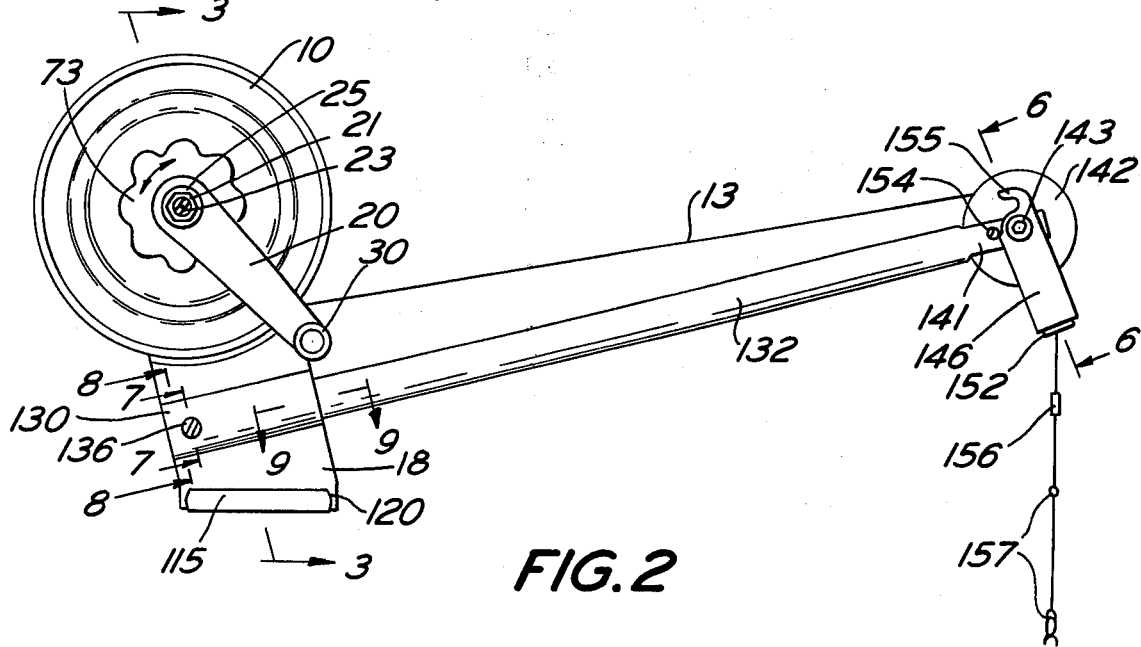

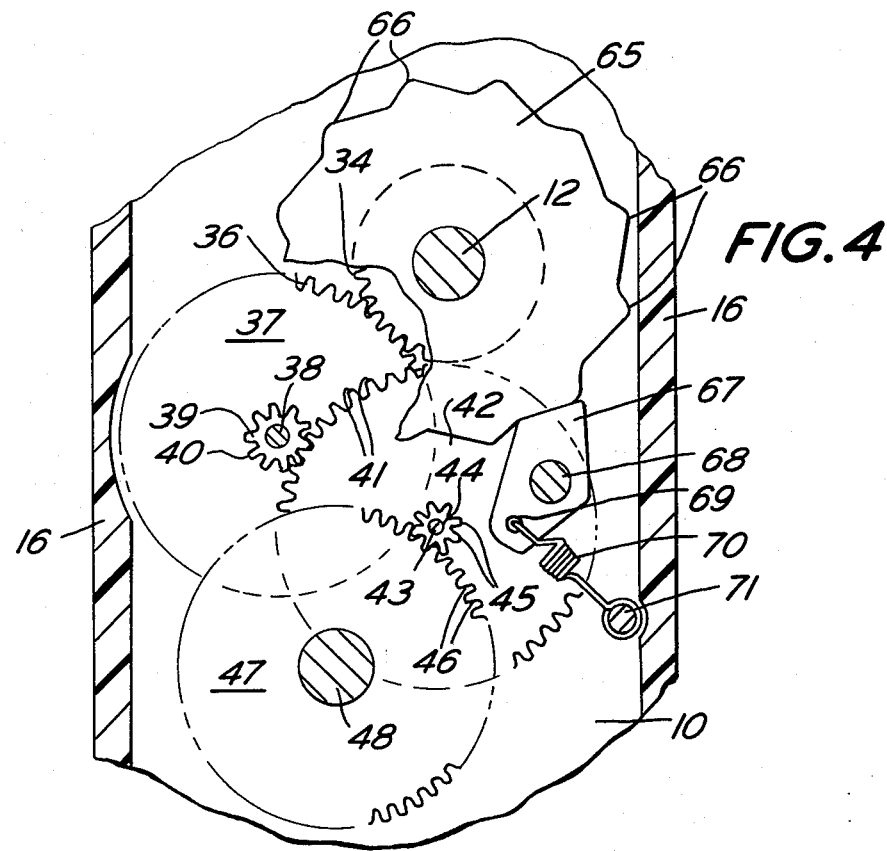
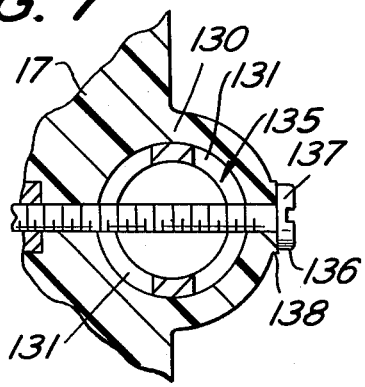
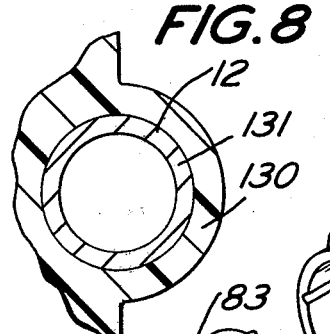
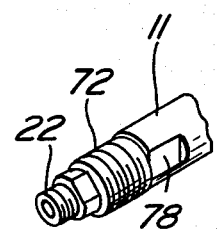
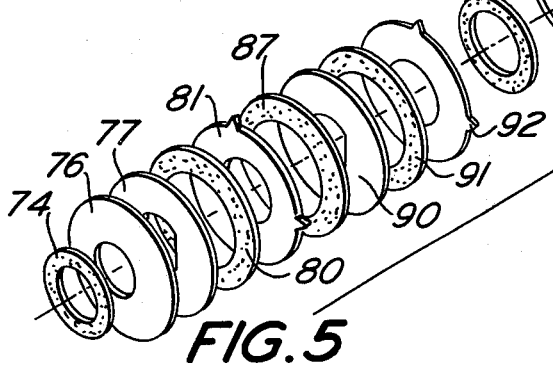
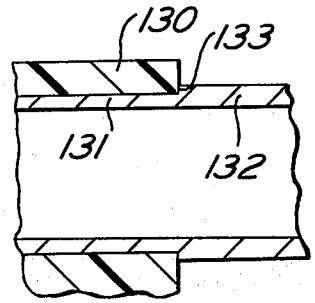

TROLLING APPARATUS

BACKGROUND OF THE INVENTION

1. Field of the Invention

This invention relates to a trolling apparatus of the reel and boom type for measured controlled depth trolling, the reel being driven for winding by a handle through a variable drag mechanism, which can slow or stop reel rotation independently of the handle rotation and which apparatus may be detachably mounted to the deck or transom of a boat.

2. Description of the Prior Art

The experienced fisherman is well aware that fish seek water of a particular temperature which varies with the type of fish. Water in the ocean as well as other bodies of water, is at different temperature zones between the surface and the bottom.

When trolling for fish it is important that the bait be at the depth where the type fish which the fisherman seeks is likely to be feeding.

The desired temperature zone depth can be determined by trial and error or by using a temperature responsive device of well known type.

With previously available apparatus a heavy weight would be fastened to the end of line to which the fishing line hook with bait would be detachable secured. The weight and fishing line would then be lowered to the desired depth. When the fish struck the hook the line would detach from the weight and the fish would be pulled into the boat separate from the weighted line.

Heavy duty reels for attachment to a boat have heretofore been proposed. Wilson, U.S. Pat. No. 3,147,935, and Sylvester U.S. Pat. No. 585,059 show such a reel but their structures are unsuitable for trolling.

It has also heretofore been proposed as shown by Walker, U.S. Pat. No. 2,099,153, to provide a tape reel for measuring depth.

Thomas, in U.S. Pat. No. 3,417,502, shows a reel and rod for heavy load fishing but the line is not accommodated for shifting of position.

Rieth, in U.S. Pat. No. 3,614,016 shows apparatus for depth control fishing which includes a reel and a flexible arm which is held laterally in a fixed position so that the accommodation of the line at the end of the arm to shifting positions is greatly limited. The only control of the reel is by a locking pin engageable in apertures in the reel.

None of the previously available apparatus was suitable for fishing using the apparatus with a hook alone or with a weight and separate line, were awkward to operate, did not provide accurate measurement of the line payout and consequent depth of the weight and fishing hook and suffered from various other shortcomings.

SUMMARY OF THE INVENTION

Trolling apparatus is provided which includes a base detachably mounted to a bracket fastened to the deck or transom of a boat, which base rotatably carries a large reel. The reel may be driven in one direction by a handle through a controlled variable drag mechanism which can be adjusted to stop the reel, permit it to run free, or slow it down, or provide varying drag for reel rotation for winding of line onto and from the reel. The line from the reel passes over a pulley mounted to a swivel boom carried by the base and through a bracket which has a bushing that acts with a stop carried on the line to prevent line entanglement with the pulley.

A counter is provided driven by a gear train from the reel, which counter measures the line payout and can be reset as desired at any time.

The principal object of the invention is to provide a trolling apparatus which can be used for trolling with a separate hook and line or for fishing with its own hook.

A further object of the invention is to provide a trolling apparatus which provides for controlled variable drag on the reel.

A further object of the invention is to provide a trolling apparatus which has a boom that swivels.

A further object of the invention is to provide a trolling apparatus which has a counter for measuring the depth of the end of the line and can be reset to zero at anytime.

A further object of the invention is to provide a trolling apparatus which is detachably secured to a block which can be permanently mounted to the deck or transom of a boat.

A further object of the invention is to provide a heat absorbing and dissipating protective ring or sleeve associated with the drag and protecting the reel from the heat at the drag.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is a perspective view of the apparatus of the invention;

FIG. 2 is a side elevational view of the apparatus of the invention;

FIG. 4 is a fragmentary vertical sectional view taken approximately on the line 4—4 of FIG. 3;

FIG. 5 is an exploded view of a portion of the apparatus of the invention;

FIG. 6 is a vertical sectional view, enlarged, taken approximately on the line 6—6 of FIG. 2;

FIG. 7 is a fragmentary vertical sectional view, enlarged, taken approximately on the line 7—7 of FIG. 2;

FIG. 8 is a fragmentary vertical sectional view, enlarged, taken approximately on the line 8—8 of FIG. 2, and FIG. 9 is a vertical sectional view taken approximately on the line 9—9 of FIG. 2.

Figure 3:
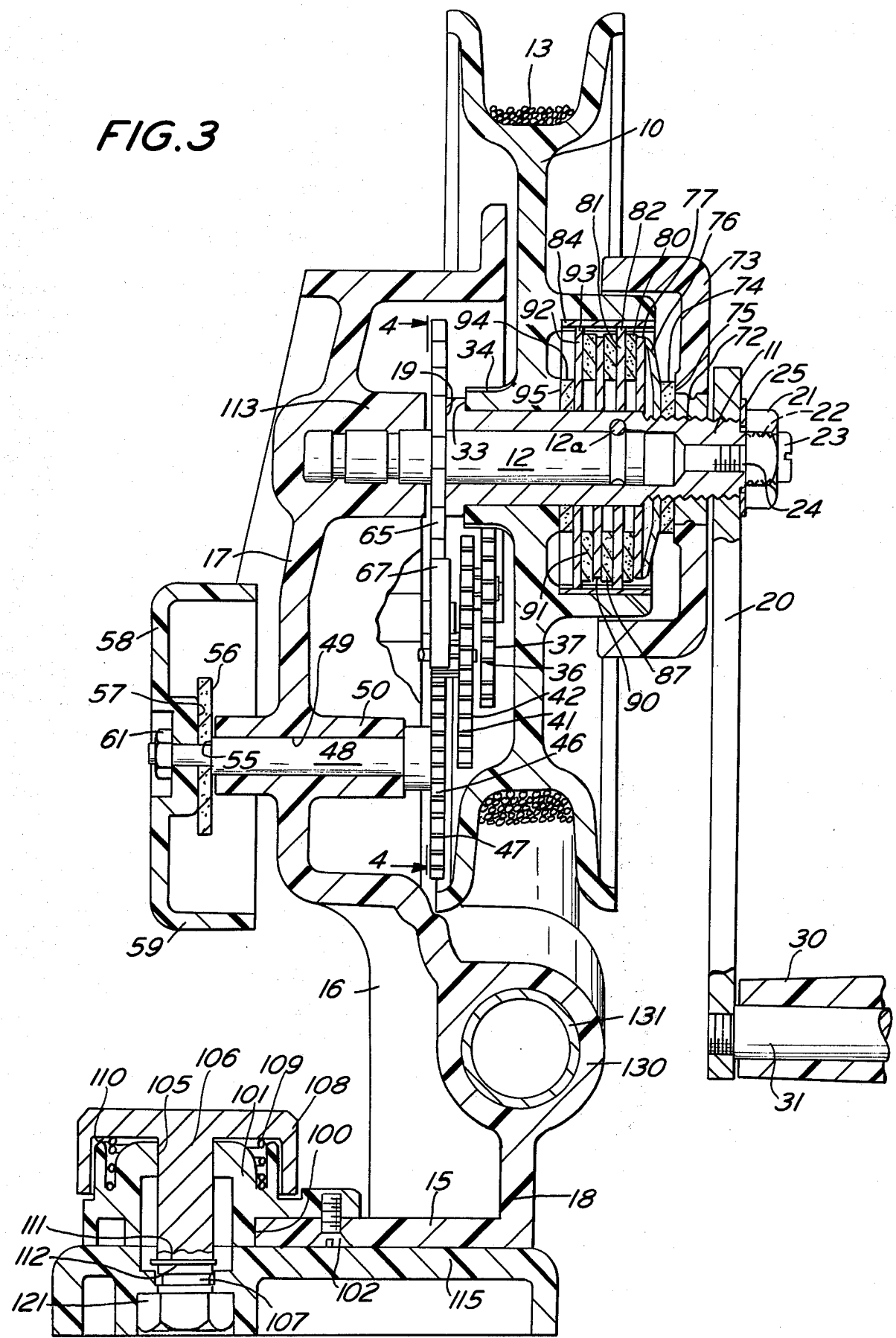
FIG. 3 is a vertical sectional view, enlarged, taken approximately on the line 3—3 of FIG. 2.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the trolling apparatus includes a reel 10 rotatably carried on a sleeve 11 which sleeve is rotatably mounted on a shaft 12 and held thereon by a pin 12a. The shaft 12 is secured to and carried in boss 113 of a base assembly 14.

The reel 10 is preferably formed of a moulded synthetic plastic.

The perimeter of reel 10 is U-shaped for winding of line 13 onto and from the reel. The sides of the U-shaped perimeter of reel 10 slope inwardly and downwardly.

The base assembly 14 includes a bottom plate 15, side plates 16, and front and rear connecting plate portions 17 and 18. The plates 15, 16, 17 and 18 are all integral and the base assembly is preferably moulded of synthetic plastic in one piece.

The sleeve 11 has a shoulder 19 which restrains the reel 10 from movement to the left as seen in FIG. 3. The sleeve 11 at the end opposite to shoulder 19 has a handle 20 held thereon by a friction nut 21 in threaded engagement with an end portion 22 of sleeve 11, the nut 21 being retained by a screw 23 engaged with an internally threaded bore 24 in the sleeve 11 and with a nylon washer 25 interposed between the nut 21 and handle 20. In order to lubricate the shaft 12 and sleeve 11 the screw 23 may be removed and lubricant placed in bore 24; the screw 23 must be replaced to seal the bore 24.

The handle 20 has a knob 30 rotatably carried on a shaft 31 secured to the handle 20 for handle rotation. The reel 10 has a shoulder 33 which abuts the shoulder 19 on sleeve 11 and has peripheral gear teeth 34 adjacent the shoulder 33.

The gear teeth 34 are engaged with teeth 36 of a larger diameter gear 37 carried on a shaft 38 supported by a boss (not shown) on connecting plate 17 of base assembly 14. The gear 37 has a smaller diameter gear 39 secured to it which has teeth 40 engaged with teeth 41 of a larger diameter gear 42. The gear 42 is carried on shaft 43 rotatably mounted in a boss (not shown) on plate 17 of base assembly 14 and has a smaller diameter gear 44 integral therewith with its teeth 45 engaged with the teeth 46 of a larger diameter gear 47.

The gear 47 is carried on a shaft 48 which is rotatably mounted in bore 49 of a boss 50 on plate 17.

The gears 37, 39, 42, 44 and 47 act as a reduction gear train between reel 10 and gear 47.

The shaft 48 has a shoulder 55 at the end opposite to gear 47 with a friction disc 56 of well known type carried thereon and engaging a face portion 57 of a counter wheel 58 which is provided with indicia 60 on its outer rim 59. The wheel 58 is held on shaft 48 by nut 61 but can be rotated independently of shaft 48 against the friction of the ring 56. A pointer 62 is provided mounted on plate 17 of base assembly 14 which pointer is used as a reference point for the indicia 60.

The sleeve 11, adjacent the shoulder 19 has a star wheel 65 secured thereto which has projections 66 on its perimeter which are engaged by a pawl or dog 67. The pawl 67 and projections 66 permit one way rotation of the star wheel 65. The pawl 67 is mounted on a shaft 68, and has an aperture 69 thereon which is engaged by spring 70 secured to pin 71 fastened to plate 18 of base assembly 14. The spring 70 urges the pawl 67 into engagement with the projections 66.

The sleeve 11 inwardly of handle 20 has a threaded portion 72 with which an adjustable drag wheel 73 is engaged and which wheel 73 rotates with the sleeve 11 and by its inward or outward position controls the drag as pointed out below.

The drag wheel 73 has a friction disc 74 adjacent its inner face 75 bearing on a tension washer 76 carried on the end portion 72 of sleeve 11.

The tension washer 76 bears against a key washer 77 carried by the sleeve 11 and engaged with flats 78 on sleeve 11.

The key washer 77 bears against a friction disc 80 of well known type and preferably of asbestos which bears against a thrust washer 81 which has projections 82 carried in the grooves 83 of protective sleeve 84. The sleeve 84, carried in a drag collar on the reel 10, is preferably formed of aluminum and acts to reduce heat transfer to the plastic reel 10.

The thrust washer 81 bears against a friction disc 87 similar to disc 80 which disc 87 bears against a key washer 90 also engaged with the flats 78 of sleeve 11.

The key washer 90 bears against a friction disc 91 similar to disc 87 which bears against a thrust washer 92 similar to washer 81 and has projections 93 engaged in the grooves 83 of insulator sleeve 84.

The thrust washer 92 bears against a friction disc 94 which bears against a shoulder 95 of the reel 10.

Potential heat generating parts 76, 77, 80, 81, 87, 90, 91 and 92 are surrounded effectively by friction discs 74 and 94 and the sleeve 84 which combined together reduce heat transfer to the plastic reel 10 and the drag wheel 73.

The bottom plate 15 of base assembly 14 has a cut out 100 which contains a boss portion 101 which is retained thereto by screws 102 and adhesive (not shown) between the boss 101 and plate 15.

The boss 101 has a bore 105 which contains a bolt 106 which has a shaft 107 and a knurled head 108.

The bolt 106 is urged upwardly by a spring 109 which is received in a recess 110 of the bolt head 108 and bears against boss 101.

A snap ring 111 is provided carried on shaft 107 in groove 112 to restrain the upward movement of bolt 106.

A block 115 is provided which may be permanently fastened to the deck or transom of a boat (not shown) in any desired manner such as by screws (not shown). The block 115 is rectangular in shape with beveled side edges 16 which are engaged in grooves (not shown) in the base assembly 14 below the bottom plate 15. The block 115 has stop projections 120 at one end to assist in retaining the base assembly 14 thereon. The block 115 is provided with a nut 121 therein which receives the shaft 107 to detachably retain the base assembly 14 in place but permit of quick removal when desired.

The plate 18 has an integral cylindrical sleeve 130 thereon which receives the end portion 131 of a hollow boom 132. The boom 132 is preferably formed of hollow aluminum tubing treated for corrosion resistance with an end portion 131, of reduced diameter, which forms a shoulder 133 restricting the boom movement in sleeve 130. The end portion 131 has two slots 135 therethrough which can receive bolt 136 permitting limited rotation of boom 132 but providing for its removal as desired. The bolt 136 has a head 137 which bears on a boss 138 on the sleeve 130.

The boom 132 at its free end has slot 140 which forms legs 141 and receive a pulley 142 rotatably carried on a bolt 143 engaged in the legs 141 of the boom 132.

The bolt 143 also supports a U-shaped bracket 146 which has side plates 147 and a connecting plate 150.

The plate 150 is provided with a hole 151 which carries a bushing 152, preferably of stainless steel which is provided with a tapered hole 153 for passage of line 13 from the reel 10.

Screws 154 are provided in each of the legs 141 which with hook like projections 155 of the side plates 147 restrict the swinging movement of bracket 146.

The line 13 can have a stop 156 thereon of cylindrical shape which when the line is wound onto the reel 10 prevents the line and its attachments 157 from getting past the bushing 152 and jamming onto the pulley 10.

The mode of operation will now be pointed out.

Assuming that a supply of line 13 is wound onto the reel 10 and suitable attachments 157 are provided on the end of the line 13 and that trolling is desired, a weight (not shown) is attached to the attachments 157 and a fishing line (not shown) with hook (not shown) and quick release mechanism (not shown) is connected to attachments 157. The depth to which it is desired to troll is determined and the drag wheel 73 is rotated counterclockwise as seen in FIG. 2 to release the tension washer 76 from active contact so that reel 10 freely rotates and line 13 pays out.

The counter wheel 58 would be set with the zero mark of indicia 60 at pointer 62 prior to releasing the drag wheel 73. The rotation of reel 10 through gears 37, 39, 42, 44 and 47 rotates the wheel 58 which with indicia 60 and pointer 62 indicates the amount of line pay out.

When the desired depth is reached the drag wheel 73 is rotated clockwise as seen from FIG. 2 which through tension washer 76, key washer 77, friction disc 80, thrust washer 81, friction disc 87, key washer 90, friction disc 91, thrust washer 92 and insulator disc 94 bears against the shoulder 95 of the reel 10.

The reel 10 is thereby in direct locked engagement with the handle 20, the star wheel 65 is engaged with pawl 67 and further reel line pay out is stopped. When a fish strikes or when it is desired to raise the line 13 then the handle 20 may be rotated and through the mechanism described above the reel 10 may rotate clockwise and line 13 wound thereon.

The apparatus may be used for fishing without another line and hook by substitution of a hook and bait for the attachments 157 and the operation can proceed as described above.

The apparatus when used for fishing with its own hook is particularly useful when quick retrieval of the fish is desired with a minimum of effort.

It will thus be seen that apparatus has been provided with which the objects of the invention are attained.

We claim:

1. Trolling apparatus for fishing which comprises
a base assembly comprising a base,
a shaft member carried by said base and free to rotate in one direction with respect to said base,
a handle fixed to said shaft member for rotating said shaft member,
a reel for supply of line rotatably mounted on said shaft member and normally free to rotate on said shaft member,
an adjustable drag assembly carried by said shaft member and interposed between said shaft member and said reel,
a boom detachably secured to said base and having a pulley for carrying the line, and
a bracket assembly attached to said boom and receiving the line from said pulley.

2. Trolling apparatus as defined in claim 1 in which said base assembly comprises a block for permanent attachment to a boat and to which said base is detachably secured.

3. Trolling apparatus as defined in claim 1 in which said reel has a gear train in engagement therewith, and
a counter is provided driven by said gear train.

4. Trolling apparatus as defined in claim 3 in which said counter is mounted for rotation independently of said gear train for resetting.

5. Trolling apparatus as defined in claim 1 in which said drag assembly includes a plurality of washers and interposed friction discs.

6. Trolling apparatus as defined in claim 1 in which a star wheel and pawl are provided in driving engagement with said handle limiting rotation of said handle to one direction.

7. Trolling apparatus as defined in claim 1 in which said boom is mounted in said base for limited rotational movement with respect to its longitudinal axis.

8. Trolling apparatus as defined in claim 1 in which said bracket assembly is pivotally mounted on said boom on a pivotal axis transverse to the longitudinal axis of the boom.

9. Trolling apparatus as defined in claim 8 in which said bracket assembly has projections and said boom has members engaged by the projections to limit the pivotal movement of the bracket assembly.

10. Trolling apparatus for fishing comprising
a base,
a reel rotatably mounted on said base for carrying a trolling line,
a boom carried by said base and provided with a pulley for carrying said trolling line,
a handle on a shaft rotatably mounted on said base, and
a drag assembly carried by said base and interposed between said reel and said handle,
said drag assembly comprising a sleeve member carried by said reel with a plurality of interengaging friction members certain of which are carried by said shaft and certain of which are carried by said sleeve member,
said sleeve member protecting said reel from heat released by said drag assembly.

* * * * *